United States Patent
Peele et al.

(10) Patent No.: US 10,976,207 B2
(45) Date of Patent: Apr. 13, 2021

(54) SENSORS WITH ELASTOMERIC FOAMS AND USES THEREOF

(71) Applicant: Cornell University, Ithaca, NY (US)

(72) Inventors: Bryan Peele, Ithaca, NY (US); Robert Shepherd, Ithaca, NY (US); Ilse Van Meerbeek, Ithaca, NY (US)

(73) Assignee: Cornell University, Ithaca, NY (US)

( * ) Notice: Subject to any disclaimer, the term of this patent is extended or adjusted under 35 U.S.C. 154(b) by 0 days.

(21) Appl. No.: 16/477,040

(22) PCT Filed: Jan. 10, 2018

(86) PCT No.: PCT/US2018/013180
§ 371 (c)(1),
(2) Date: Jul. 10, 2019

(87) PCT Pub. No.: WO2018/132482
PCT Pub. Date: Jul. 19, 2018

(65) Prior Publication Data
US 2019/0383678 A1    Dec. 19, 2019

Related U.S. Application Data

(60) Provisional application No. 62/444,581, filed on Jan. 10, 2017.

(51) Int. Cl.
*G01L 1/00* (2006.01)
*G01L 1/24* (2006.01)
*B25J 13/08* (2006.01)
*G06F 3/03* (2006.01)

(52) U.S. Cl.
CPC ............. *G01L 1/24* (2013.01); *B25J 13/084* (2013.01); *G06F 3/0304* (2013.01)

(58) Field of Classification Search
CPC .......... G01L 1/24; B25J 13/084; G06F 3/0304
USPC ..................................... 73/862.624
See application file for complete search history.

(56) References Cited

U.S. PATENT DOCUMENTS

| | | | |
|---|---|---|---|
| 4,600,357 A | 7/1986 | Coules | |
| 4,814,562 A | 3/1989 | Langston | |
| 5,584,296 A * | 12/1996 | Cui | A61B 5/14552 356/41 |

(Continued)

FOREIGN PATENT DOCUMENTS

| | | |
|---|---|---|
| CN | 205091196 U | 3/2016 |
| CN | 106153227 A | 11/2016 |
| CN | 106708335 A | 5/2017 |
| JP | 5261786 B2 | 8/2013 |
| WO | 2017/015563 A1 | 1/2017 |

OTHER PUBLICATIONS

Levi, A., et al., Soft, Transparent, Electronic Skin for Distributed and Multiple Pressure Sensing, Sensors, May 17, 2013, vol. 13, No. 5, pp. 6578-6604.

(Continued)

*Primary Examiner* — Max H Noori
(74) *Attorney, Agent, or Firm* — Hodgson Russ LLP

(57) ABSTRACT

Provided are sensors and articles of manufacture comprising one or more sensors. Also provided are uses of the sensors. The sensors have an elastomeric foam and one or more light sources and one or more light receivers. In various examples, the light source(s) and light receiver(s) are disposed on and/or disposed in and/or partially disposed in the elastomeric foam.

37 Claims, 14 Drawing Sheets

(56) References Cited

U.S. PATENT DOCUMENTS

| | | | |
|---|---|---|---|
| 8,798,702 B2 | 8/2014 | Trumble | |
| 2007/0263222 A1* | 11/2007 | Loveless | G01N 21/474 |
| | | | 356/445 |
| 2010/0165245 A1* | 7/2010 | Chang | G02B 6/0023 |
| | | | 349/62 |
| 2010/0188270 A1 | 7/2010 | Sampsell | |
| 2015/0280488 A1* | 10/2015 | Wyrwas | H02J 7/35 |
| | | | 320/101 |
| 2015/0354792 A1* | 12/2015 | Chien | G02B 6/001 |
| | | | 362/158 |
| 2016/0089059 A1 | 3/2016 | Hu | |
| 2016/0169711 A1* | 6/2016 | Blakley | G01K 1/08 |
| | | | 374/137 |
| 2016/0253019 A1 | 9/2016 | Geaghan | |
| 2018/0022861 A1 | 1/2018 | Mitsuzuka et al. | |

OTHER PUBLICATIONS

Krehel, M., et al., Characterization of Flexible Copolymer Optical Fibers for Force Sensing Applications, Sensors, Sep. 9, 2013, vol. 13, No. 9, pp. 11956-11968.

Kadowaki, A. et al., Development of Soft Sensor Exterior Embedded with Multi-axis Deformable Tactile Sensor System, The 18th IEEE International Symposium on Robot and Human interactive Communications, Nov. 10, 2009, pp. 1093-1098.

Cirillo, A., et al., A Modular and Low-Cost Artificial Skin for Robotic Applications, the Fourth IEEE RAS/EMBS International Conference on Biomedical Robotics and Biomechatronics, Aug. 31, 2012, pp. 961-966.

Yoshikai, T., et al., Development of 4-axis Soft Deformable Sensor for Humanoid Sensor Flesh, 2011 11th IEEE-RAS International Conference on Humanoid Robots, Dec. 21, 2011, pp. 205-211.

* cited by examiner

SENSORS WITH ELASTOMERIC FOAMS AND USES THEREOF

CROSS REFERENCE TO RELATED APPLICATIONS

This application claims priority to U.S. Provisional Application No. 62/444,581, filed on Jan. 10, 2017, the disclosure of which is hereby incorporated by reference.

FIELD OF THE DISCLOSURE

The disclosure generally relates to sensors having an elastomeric foam. More particularly, the disclosure relates to sensors having an elastomeric foam and one or more light sources and one or more light receivers.

BACKGROUND OF THE DISCLOSURE

Previous sensors do not demonstrate high resolution sensing of haptic input, did not allow for direct control of the shape of a porous structure, or were restricted to particular applications, and the degree of stretching (i.e., strain) and ease of deformation (i.e., compliance) was restricted to low strains or high stiffnesses for many classes of sensors. Therefore, what is needed is an improved sensor.

SUMMARY OF THE DISCLOSURE

The present disclosure provides sensors. Also provided are uses of the sensors (e.g., methods of using the sensors). Embodiments of the sensor disclosed herein enable users to engage with, for example, computers and robots using a soft interface system.

In an aspect, the present disclosure provides sensors. The sensors can be soft foam sensors. In various examples, the sensors comprise a three-dimensional ("3D") elastomeric foam.

In an example, a sensor comprises: an elastomeric foam component (e.g., an elastomeric foam that changes at least one light transmittance property when compressed), a light source (e.g., an LED, such as, for example, an infrared LED, an optical fiber, and the like, and combinations thereof) disposed on, in, and/or partially in the elastomeric foam component; and a light receiver (e.g., a photodetector, a photodiode, a phototransistor, a photoDarlington transistor, and the like, and combinations thereof) disposed on, in, or partially in the elastomeric foam component, wherein light from the light source is received by the light receiver by way of transmission through the elastomeric foam component. (e.g., such that the light is transmitted through at least a portion of the elastomeric foam component). In an example, the light source is a plurality of light sources and the light receiver is a plurality of light receivers. In an example, the plurality of light sources and plurality of light receivers are randomly or non-randomly arranged (e.g., non-randomly arranged in an array).

In an aspect, the present disclosure provides uses of the sensors of the present disclosure. In various examples, one or more sensors are integrated into various articles of manufacture. In various examples, various methods use one or more sensors. In various examples, various systems comprise one or more sensors.

There are many potential uses for this soft interface. For example, the device could be used as a new touch input for conventional computers. The device would accept input like a conventional touchscreen, but with the additional capability of sensing depth. This extra capability could be beneficial for design software, allowing users to impart more information based on the applied pressure. This may allow more natural drawing or sculpting of digital objects.

An article of manufacture can comprise one or more sensors of the present disclosure. In an example, a touch input for a computing device comprises one or more sensor of the present disclosure. In an example, a household object comprises one or more sensor of the present disclosure. In an example, a soft robot skin comprises one or more sensor of the present disclosure. In an example, a feedback system comprises one or more sensor of the present disclosure.

One or more sensors of the present disclosure can be used in methods. For example, a method comprises: applying a force to a sensor of the present disclosure; and determining, using, for example, a controller, a position, and depth of the force applied to the sensor. A method may further comprises generating, using, for example, a controller, an output based on the position and the depth of the force and/or using the output from the sensor as an input in another device (e.g., a computing device, a household object, a soft robot skin, a feedback system for a soft robotic system).

In an example, a non-transitory computer-readable storage medium, comprising one or more programs for executing the following steps on one or more computing devices: receiving a signal from a sensor of the present disclosure, where the signal corresponds to a force applied to the sensor; and determining a position and a depth of the force applied to the sensor, wherein the determining is based at least in part on a transmittance of light between a light source and a light receiver in the sensor.

BRIEF DESCRIPTION OF THE FIGURES

For a fuller understanding of the nature and objects of the disclosure, reference should be made to the following detailed description taken in conjunction with the accompanying figures.

DETAILED DESCRIPTION OF THE DISCLOSURE

Figure 1:
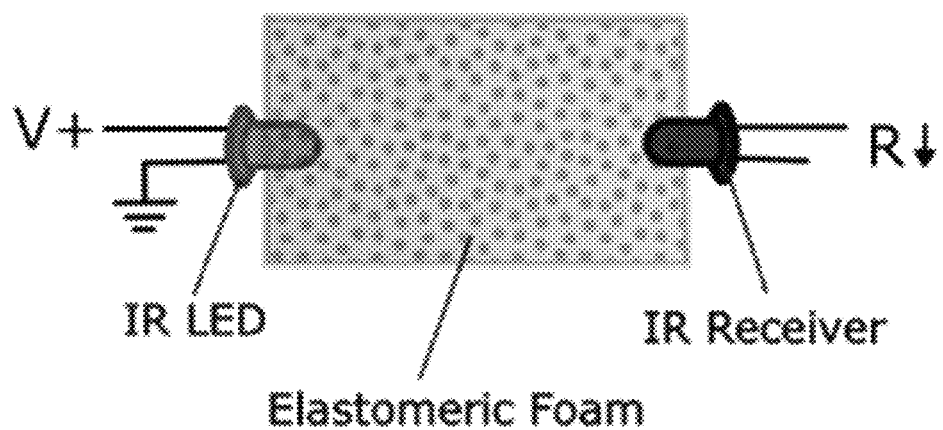
FIG. 1 illustrates an exemplary pressure sensor using the compression of an elastomeric foam to lower transmittance. As the foam collapses, more light is blocked and the resistance across the IR receivers is increased.
Figure 1:
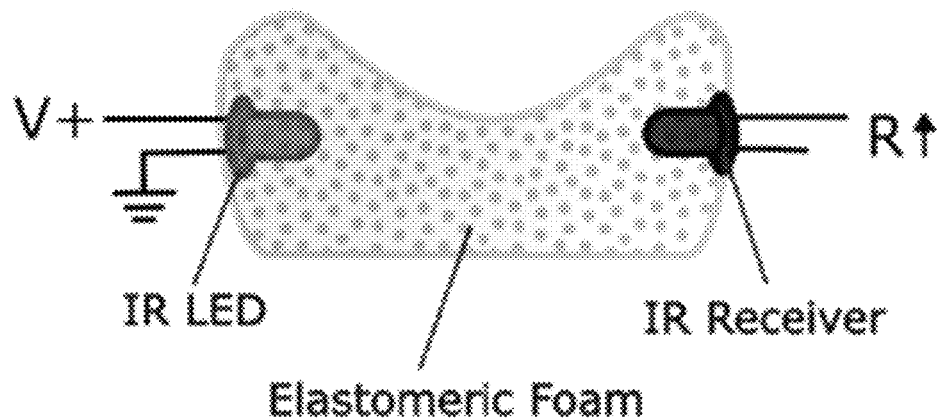

Although claimed subject matter will be described in terms of certain embodiments, other embodiments, including embodiments that do not provide all of the benefits and features set forth herein, are also within the scope of this disclosure. Various structural, logical, process step, and electronic changes may be made without departing from the scope of the disclosure.

Ranges of values are disclosed herein. The ranges set out a lower limit value and an upper limit value. Unless otherwise stated, the ranges include all values to the magnitude of the smallest value (either lower limit value or upper limit value) and ranges between the values of the stated range.

The present disclosure provides sensors. Also provided are uses of the sensors (e.g., methods of using the sensors).

Embodiments of the sensor disclosed herein enable users to engage with, for example, computers and robots using a soft interface system. The user is able to use touch input along a surface, but with the added capability of depth sensing. This system offers rich sensory input in a soft system that is pleasant to touch.

In an aspect, the present disclosure provides sensors. The sensors can be soft foam sensors. In various examples, the sensors comprise a three-dimensional ("3D") elastomeric foam.

A soft foam sensor that can measure deformation, such as, for example, 3D deformations, based on variable transmission of light through elastomeric foams is disclosed. One or more light sources (e.g., photoemitters such as, for example, LEDs) and one or more detectors (e.g., photodiodes) can be disposed in the foam to determine location and amount of force applied to the soft interface. Machine learning techniques can be applied to convert raw signals to information about the deformation mode.

The spatial resolution of the haptic input in the presently-disclosed sensor can be significantly higher than the number of light receivers. Rather than using a single light receiver for a single measure, some embodiments utilize more than one light receiver, sensor data can be input into machine learning algorithms to determine the location of haptic input based on readings from multiple or all of the light receivers.

In an example, a sensor has an elastomeric foam component. A light source is disposed on, disposed in, or partially disposed in the elastomeric foam components. A light receiver is disposed on, disposed in, or partially disposed in the elastomeric foam component. The light source and the light receiver are arranged such that at least a portion of light from the light source is received by the light receiver by way of transmission through the elastomeric foam component. In some embodiments, the light source is made up of a plurality of light sources. In other words, the sensor may include more than one light source. The light sources of the plurality of light sources may be disposed on and/or disposed in and/or partially disposed in the elastomeric foam. In some embodiments, the light receiver is made up of a plurality of light receivers. In other words, the sensor may include more than one light receiver. The light receivers of the plurality of light receivers may be disposed on and/or disposed in and/or partially disposed in the elastomeric foam. The light sources may be infrared LEDs or other types of light sources, such as, for example, light sources described herein. The light receivers may be infrared receivers or other types of light receivers, such as, for example, light receivers described herein. The light sources and light receivers may be arranged in an array. The light sources can be arranged to direct light within the elastomeric foam component. For example, the light sources and light receivers are arranged to direct light within the elastomeric foam component such that at least a portion of the light transmitted from a light source to a receiver goes through the foam. The light sources and light receivers may provide or receive visible (from 400 to 700 nm), infrared (from 700 nm to 1 mm), or ultraviolet light. In an example, the infrared LEDs and phototransistors operate at 940 nm.

In another example, the light sources are optical fibers disposed in the elastomeric foam component. The optical fibers are connected to or configured to be connected to one or more other light generation systems (e.g., an LED).

While described as being disposed in the elastomeric foam, the light sources and light receivers (e.g., optical fibers) also may be disposed on a surface of the elastomeric foam without penetrating the elastomeric foam or partially penetrating the foam.

In various examples, the elastomeric film is transparent, translucent, or opaque with regard to a selected wavelength or selected wavelengths of light. The elastomeric foam component may be colored such that an effect of ambient light is minimized. For example, an encapsulation layer surrounding the foam also can be chosen to block specific wavelengths of light. The elastomeric foam for infrared light sources may appear opaque (e.g., opaque to visible light). In an example, the elastomeric foam is at least 5% transparent to light having a wavelength of 250 nm to 2,000 nm, including all integer nm values and ranges therebetween. In various examples, the elastomeric foam is at least 10%, at least 20%, at least 30%, at least 50%, at least 75%, at least 90%, at least 95%, or 100% transparent to light having a wavelength of 250 nm to 1,000 nm or 900 nm to 1,000 nm. In an example, the elastomeric foam is 5-100% transparent to light having a wavelength of 250 nm to 2,000 nm, 250 nm to 1000 nm, 350 to 1,000 nm, or 900 nm to 1,000 nm. In an example, the elastomeric foam is not a transparent, non-scattering material. In an example, the elastomeric foam is not a plastic material. In an example, the elastomeric material does not comprise a dye.

Without intending to be bound by any particular theory, it is considered that a sensor detects a signal based on a change in scattering properties of an elastomeric foam on deformation of the foam. For example, deformation of the foam increases the transparency of the film to (decreases the scattering of) a particular wavelength or wavelengths of light and the signal from one or more detector increases. In another example, deformation of the foam increases the absorbance transparency of the film to (increases the scattering of) a particular wavelength or wavelengths of light and the signal from one or more detector increases.

The elastomeric foam comprises a polymer material that above its glass transition temperature ($T_g$) exhibits an elastic restoring force. In an example, the elastomeric foam exhibits recovery from a strain (e.g., a change in at least one dimension of the elastomeric foam) of 1-1000%, including all integer % values and ranges therebetween. In various examples, the elastomeric foam exhibits recovery from a strain of 5-1000%, 10-1000% or 20-1000%. By recovery it is meant that on removal of the stress causing the strain the elastomeric foam (e.g., the at least one dimension of the foam that is changed) returns to substantially its original shape (e.g., within 0.5% or less, within 0.01%, or within 0.001% of its original shape) or its original shape. The elastomeric foam may be silicone, polyurethane, or other materials known to those skilled in the art. The transmission range for a given light source (e.g., LED) may be dependent on the porosity of the foam structure as well the material's translucence. As this range decreases, the number of emitters and receivers needed for a given resolution may increase. The power and wavelength of the light source(s) (e.g., LED(s)) also may affect this range.

The elastomeric form can be a porous elastomeric foam or a non-porous elastomeric foam. In various examples, the elastomeric foam is a multiphase material.

The porosity of the elastomeric foam can vary. In an example, the porosity of the elastomeric film is from 12% to 95%, including all 0.1% values and ranges therebetween. In an example, the porosity of the elastomeric film is from 5% to 95%, including all 0.1% values and ranges therebetween. In various examples, the porosity is 15% or greater, 20% or greater, 25% or greater, 30% or greater, 40% or greater, 50% or greater, 60% or greater, 70% or greater, 80% or greater, or 90% or greater. In some examples, porosities less than 10% or greater than 95% may be unsuitable (e.g., may be too weak to support a load). However, this is not true for all designs. The elastomeric foam can have a porosity of 0% (e.g., rubber).

In various examples, the elastomeric foam comprises air and/or liquid and/or solid particles. The liquid may be disposed in at least a portion of or all of the pores of the elastomeric foam. Non-limiting examples of liquids include silicone oils, hydrocarbon oils (e.g., hexadecanes), water, and the like, and combinations thereof. Non-limiting examples of solid particles include silica particles, carbon black, silicon carbide, and the like, and combinations thereof. In an example, the elastomeric foam does not comprise absorbing materials (e.g., absorbing carbon materials such as, for example, carbon nanotubes).

Elastic modulus of the elastomeric foam can vary based on the intended design or application. An elastic modulus may be too low to support the elastomeric foam for certain designs or an elastic modulus may be too high to provide a desired stiffness for certain designs. For example, an elastic modulus less than 10 kPa may be too soft and greater than 10 GPa may be too stiff for certain designs or applications.

Strain to failure of the elastomeric foam can be varied for a particular design or application. For example, a strain to failure of less than 1.0% or less than 0.1% may be too brittle for certain designs or applications.

It is desirable that the elastomeric foam be compliant. Compliance may be referred to as mechanical compliance. In an example, the elastomeric foam exhibits a compliance of 0.001 $mN^{-1}$ to 1 $mN^{-1}$, including all 0.001 $mN^{-1}$ values and ranges therebetween.

The elastomeric foam can have various shapes. In an example, the elastomeric foam has a 3D shape. In various examples, the elastomeric foam has at least one dimension (e.g., a longest dimension) of 0.1 mm to 10 meters, including all 0.1 mm values and ranges therebetween. In certain examples, the elastomeric foam has one or more dimension (e.g., thickness) from 1 cm to tens of centimeters. In certain examples, the elastomeric foam has dimensions up to 1 m. Other dimensions are possible. In an example, the elastomeric foam has dimensions that a human can interact with comfortably. Thus, the elastomeric foam may have dimensions that enable comfortable interaction with a human appendage or digit. In an example, the elastomeric foam is not a film (e.g., a film having a thickness of less than 10 microns). In an example, the elastomeric foam is continuous. In an example, the elastomeric foam does not comprise discrete segments that change their relative orientation on deformation of the elastomeric foam. In an example, the elastomeric foam does not have a metal coating disposed on at least a portion of or all of the exterior surface of the foam.

The elastomeric foam can exhibit desirable power loss. Without intending to be bound by any particular theory, it is considered that deformation of the elastomeric foam changes the light transmittance through the film by changing the scattering properties of the elastomeric foam (e.g., the output signal is based on the scattering properties of the elastomeric foam). For example, the sensitivity of the elastomeric foam (which can also be referred to as propagation loss) is 0.1-1,000 dB/cm, including all 0.1 dB values and ranges therebetween) for light having a wavelength of 250-1500 nm, including all integer nm values and ranges therebetween. In various examples, the sensitivity of the elastomeric foam is 0.5-20 dB/cm, 0.7-20 dB/cm, or 1 dB/cm for light having a wavelength of 350-1000 nm. In various examples, the sensitivity of the elastomeric foam is at least 0.5, at least 0.7, or at least 1 dB/cm for light having a wavelength of 350-1000 nm.

Figure 2:
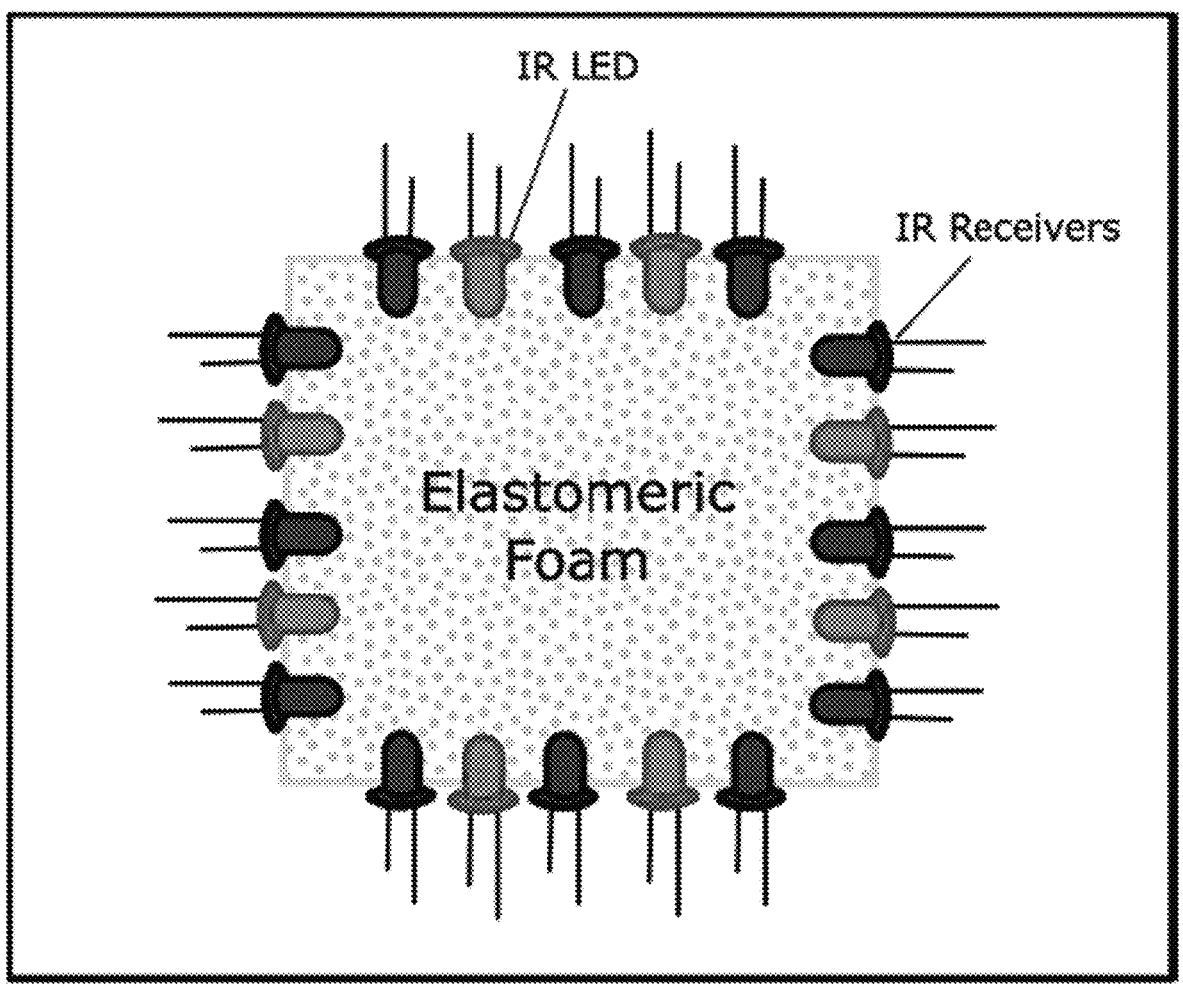
FIG. 2 illustrates an exemplary array of infrared (IR) LEDs and receivers around the edge of an elastomeric foam to create a soft touch sensor.

The light sources and light receivers can alternate around an outer surface of the elastomeric foam component in an array. For example, as shown in FIG. 2, the edges can be used to concentrate rigid elements and simplify wiring. However, other arrangements of light sources and light receivers are possible. A light source need not be positioned directly opposite a receiver. In FIG. 2, for example, light sources (IR LEDs) and light receivers (IR receivers) alternate around the perimeter of the elastomeric foam. Light receivers are positioned adjacent one another at each of the four corners. Light sources are not directly opposite light receivers.

The pattern of light sources and light receivers can be uniform or not uniform, for example, randomized. In an example, the light sources and light receivers have random localization, meaning the arrangement is not regular. The light sources and light receivers can be disposed anywhere in a sensor. In an example, the light sources and light receivers are not solely in a planar arrangement. In an example, the light receivers are not a single camera.

Different numbers of light sources and light receivers can be used (i.e., a one-to-one ratio of light sources and light receivers is not needed). Each receiver, however, may be within range of at least one light source to contribute useful information about the system. All light sources may provide light during sensor operation or only some of the light sources may provide light during sensor operation. Determining a position and depth of force applied to the sensor may be based at least in part on a transmittance of light between at least one of the light sources (e.g., all the light sources or only some of the light sources) and at least one of the light receivers (e.g., all the light receivers or only some of the light receivers).

Translucence, power, and porosity can affect light transmission between the light sources and light receivers. The light receivers may be positioned or otherwise configured to receive a sufficient amount of light for operation. Depending on the properties of the elastomeric foam and the power of the light source, the light receiver may be positioned 10 cm or less from the light source. In an example, the light receiver may be positioned at least 1 cm and less than 10 cm from the light source, including all values to the 0.1 cm and ranges between. Other dimensions are possible.

The sensor may further include a controller, such as a microcontroller, configured to drive the light sources and receive signals (e.g., voltages) from the light receivers. The sensor may further include at least one (e.g., two) multiplexers in electronic communication with the light receivers. The controller may be configured to determine a position and depth of an item (e.g., a finger) in contact with the elastomeric foam component.

In an example, 32 light receivers were used in a sensor area of 64 $cm^2$, but other densities of light receivers are possible. For example, 16 receivers or fewer in a 64 $cm^2$ sensor area may yield an acceptable resolution. In another example, the light receivers may be spaced apart by 1 cm or more.

The sensor may further include a housing configured to contain the elastomeric foam component.

During operation, a force is applied to an embodiment of the sensor disclosed herein. A position and/or a depth of the force applied to the sensor is determined using the controller. An output may be generated using the controller based on the position and/or the depth of the force. Determining the position and depth may be based at least in part on a transmittance of light between one of the light sources and one of the light receivers. The output from the sensor may be used as an input in another device (e.g., a computing device, a household object, a soft robot skin, a feedback system for a soft robotic system).

A variety of machine learning techniques (e.g., decision trees, neural networks, deep learning, etc.) can be used to create nonlinear models that fit input locations to sensor data. A training procedure can be used to collect representative data samples over the expected range of input. For example, in the case of a single touch input, a mechanized probe is moved to a series of known X, Y and Z locations throughout the sensor. At each location, measurements are recorded for each light receiver. In the case where the light sources are varied, multiple measurements may be taken for each light receiver. Each measurement can constitute an input parameter. For the training data, each set of input parameters is associated with known outputs (e.g., location(s) of the touch input(s)). Using this training data, nonlinear models can be automatically generated using machine learning to map between the input parameters (e.g., sensor data) and outputs (e.g., touch locations). After this calibration is complete, these models can be used with new sensor data to determine the locations of touch input.

Using the interactions between light sources and light receivers to determine input allows the sensor to include large volumes of foam that are not encumbered with rigid electronic sensors. This allows the whole system to remain flexible or stretchable, depending on the foam that is selected. In an example, a largely static embodiment of the foam, with deformations limited to the location of touch input, may be used. However, touch input can be sensed while undergoing gross deformations to the whole structure. For this operation, training data may be collected over a range of expected deformations.

This flexibility opens up new applications by allowing the interface to conform to 3D objects. Additionally, the system can easily be adapted to arbitrary 3D shapes. This is true for at least two reasons: (1) the foams can be easily molded with the light sources and light receivers embedded along the edges or in islands throughout the foam for greater coverage; and (2) the machine learning algorithms do not require specific placement of the light sources and light receivers or modelling of the physical system; instead, the system is trained on known haptic inputs and autonomously builds a model for the sensor data.

The disclosed sensor is not limited to the exemplary architecture (electronics around the perimeter of a flat sheet of elastomer foam). The electronics could be distributed throughout the body of the foam or on the perimeter and within the body of the foam, and the foam could be molded into 3D shapes for other applications. For example, the foam could be molded over the surface of a robot to form a soft skin that allows the user to provide haptic input by touching its body.

If the device contains a rigid structure, the electronics could be incorporated into the rigid structural elements and then covered in foam. For example, the LEDs and phototransistors could be distributed along the skeletal structure of a robotic arm prior to molding foam around the entire structure. Such an embodiment can provide simple electrical routing to provide power to the electronic elements.

For fully soft devices (e.g., pillows), electronics, such as, for example, the light sources and light receivers, can be distributed throughout the foam as islands. For a wireless system, batteries could be used in each island and wireless communication (e.g., Bluetooth, WiFi, radio, etc.) could be used to transmit data. For a wired version, loose wire could be included between islands, with the limitation of reduced strain capabilities for the foam.

The embodiments disclosed herein can be extended to include multi-touch input through improved sensing algorithms. Sensing hardware may remain unchanged for multi-touch input. More sophisticated testing procedures, however, may be used to collect training data. Rather than moving a single probe to a known locations and collecting sensor readings, multiple probes can be used to sample the space. The same model fitting techniques can be used with this larger training set, with regression models developed for the X, Y and Z location of each probe. Additionally, classification models would be needed to identify the number of touch inputs currently being used (e.g., analogous to the binary classification model used in the prototype to distinguish between "touch" and "no touch").

The elastomer foam can also be dynamically actuated with the electronics embedded to sense deformations. With this architecture, the system would be able to sense its actuated position in addition to external stimuli.

Embodiments of the sensors are not limited to the materials listed herein. Many different elastomers could be used for the foam, including silicones, polyurethanes, other thermoset and/or thermoplastic elastomers, and combinations thereof. In addition to working with elastomeric foams, this system could also sense deformation within a porous network of discrete particles (e.g., polystyrene beads).

In an aspect, the present disclosure provides uses of the sensors of the present disclosure. In various examples, one or more sensors are integrated into various articles of manufacture. In various examples, various methods use one or more sensors. In various examples, various systems comprise one or more sensors.

There are many potential uses for this soft interface. For example, the device could be used as a new touch input for conventional computers. The device would accept input like a conventional touchscreen, but with the additional capability of sensing depth. This extra capability could be beneficial for design software, allowing users to impart more information based on the applied pressure. This may allow more natural drawing or sculpting of digital objects.

This soft interface could also be integrated into household objects such pillows, bedding, or other furniture to create non-invasive control systems for various technologies within the home.

The system could also be used as a soft skin for a robot, creating more natural human robot interaction. The skin would allow the robot to sense where it is being touched, and with what force.

For soft robotic systems, this system could be coupled with fluidic elastomer actuators to allow the robot to sense both its own position and input from external systems. These feedback systems would enable greater autonomy for soft robots.

The system disclosed herein can be used with actuators in applications besides soft robotics.

The following Statements provide examples of apparatuses, methods, and devices of the present disclosure:

Statement 1. A sensor comprising: an elastomeric foam component (e.g., an elastomeric foam that changes at least one light transmittance property when compressed), a light source (e.g., an LED, such as, for example, an infrared LED, an optical fiber, and the like, and combinations thereof) disposed on, in, and/or partially in the elastomeric foam component; and a light receiver (e.g., a photodetector, a photodiode, a phototransistor, a photoDarlington transistor, and the like, and combinations thereof) disposed on, in, or partially in the elastomeric foam component, wherein light from the light source is received by the light receiver by way of transmission through the elastomeric foam component. (e.g., such that the light is transmitted through at least a portion of the elastomeric foam component).

Statement 2. A sensor according to Statement 1, wherein the light source is a plurality of light sources and the light receiver is a plurality of light receivers.

Statement 3. A sensor according to Statement 1 or 2, where the elastomeric foam is at least one of silicone or polyurethane.

Statement 4. A sensor according to Statement 2 or 3, where the plurality of light sources and plurality of light receivers are arranged in an array.

Statement 5. A sensor according to any one of Statements 2-4, where the plurality of light sources and plurality of light receivers alternate around an outer surface of the elastomeric foam component in the array.

Statement 6. A sensor according to any one of Statements 2-5, further comprising a controller (e.g., a microcontroller) configured to drive the plurality of light sources and receive signals (e.g., voltages) from the plurality of light receivers.

Statement 7. A sensor according to Statement 6, further comprising at least one (e.g., two) multiplexers in electronic communication with the plurality of light receivers.

Statement 8. A sensor according to any one of Statements 2-7, where the controller is configured to determine a position and/or depth of an item (e.g., a finger) in contact with the elastomeric foam component.

Statement 9. A sensor according to any one of Statements 2-8, further comprising a housing configured to contain the elastomeric foam component.

Statement 10. A sensor according to any one of Statements 2-9, where the elastomeric foam component is colored such that an effect of ambient light is reduced or eliminated.

Statement 11. A sensor according to any one of Statements 2-10, where a number of light sources and a number of light receivers are different.

Statement 12. A sensor according to any one of Statements 2-11, where the light sources and light receivers have randomized localization.

Statement 13. A sensor according to any one of Statements 2-12, where the light sources are optical fibers and further comprising a light generation device connected to the optical fibers.

Statement 14. A touch input for a computing device comprising one or more sensor of the present disclosure (e.g., one or more sensor of any one of Statements 1-13).

Statement 15. A household object comprising one or more sensor of the present disclosure (e.g., one or more sensor of any one of Statements 1-13).

Statement 16. A soft robot skin comprising one or more sensor of the present disclosure (e.g., one or more sensor of any one of Statements 1-13).

Statement 17. A feedback system for a soft robotic system comprising one or more sensor of the present disclosure (e.g., one or more sensor of any one of Statements 1-13).

Statement 18. A method comprising: applying a force to a sensor of the present disclosure (e.g., a sensor of any one of Statements 1-13); and determining, using the controller, a position and a depth of the force applied to the sensor.

Statement 19. A method according to Statement 18, further comprising generating, using the controller, an output based on the position and the depth of the force.

Statement 20. A method according to Statement 18 or 19, further comprising using the output from the sensor as an input in another device (e.g., a computing device, a household object, a soft robot skin, a feedback system for a soft robotic system).

Statement 21. A method according to any one of Statements 18-20, where the determining is based at least in part on a transmittance of light between at least one of the light sources (e.g., all the light sources or only some (such as, for example, a selected number) of the light sources) and at least one of the light receivers (e.g., all the light receivers or only some (such as, for example, a selected number) of the light receivers).

Statement 22. A non-transitory computer-readable storage medium, comprising one or more programs for executing the following steps on one or more computing devices: receiving a signal from a sensor of the present disclosure (e.g., a sensor of any one of Statements 1-13), where the signal corresponds to a force applied to the sensor; and determining a position and a depth of the force applied to the sensor, wherein the determining is based at least in part on a transmittance of light between a light source and a light receiver in the sensor.

The following example is presented to illustrate the present disclosure. It is not intended to limiting in any matter.

Example 1

This example provides a description of a sensor of the present disclosure.

A sensor was made and fabricated as a soft touch sensor using an elastomeric foam with embedded infrared (IR) LEDs and receivers. The soft touch sensor is able to identify the location and depth of a press into the foam. A testing apparatus was developed to collect training data by probing the sensor at known positions and collecting data from the IR receivers. Eight distinct patterns were applied to 32 LEDs and measure the voltage across 32 phototransistors for each state, yielding 256 training features. Random forests were used to generate a model capable of predicting the probe's location. First, a classification model was used to determine whether the probe is pressing the sensor (with >98% accuracy). For cases where the probe is pressing the foam, the root-mean-square error (RMSE) of the predicted location is <1.6 mm, and the RMSE of the predicted depth is <0.6 mm.

As robots transition from industrial automation tools to devices that interact directly with humans, new hardware is needed to ensure that these interactions are safe and comfortable for the user. Soft robots use elastomeric materials with low mechanical compliance to create systems that are intrinsically safe for human interaction. Haptic feedback can facilitate natural interactions with to the robot, allowing it to know where, and how firmly, the user is touching it.

Elastomeric foams (e.g. silicone, polyurethanes) are a lightweight, highly stretchable material that are easily molded into 3D shapes for use as pneumatic actuators. Photoreflective sensors have been embedded in polyester padding to serve as sensors for soft objects such as pillows. FIG. 1 shows a proposed design for embedding infrared (IR) LEDs and receivers into an elastomeric foam. As the foam is compressed, the transmittance of the foam decreases. This decreased transmittance corresponds to an increase in resistance for the IR receiver that corresponds to the pressure applied to the foam. As light from a point source obeys the inverse square law, the distance from the light source should be proportional to that scaling, regardless of compression.

The mechanism shown in FIG. 1 can be extended to create a soft touch screen by using an array of IR LEDs and receivers placed around the edges of a piece of foam, as shown in FIG. 2. With the addition of more sensors and receivers, the relationship between resistance and force input is not directly proportional, as in the case of a single sensor. Although the IR receivers provide a rich source of information about the deformation experienced by the foam, the process of analytically building and calibrating a model would be time intensive. For this reason, a method of autonomously collecting data and building a model using machine learning was selected.

Figure 3:
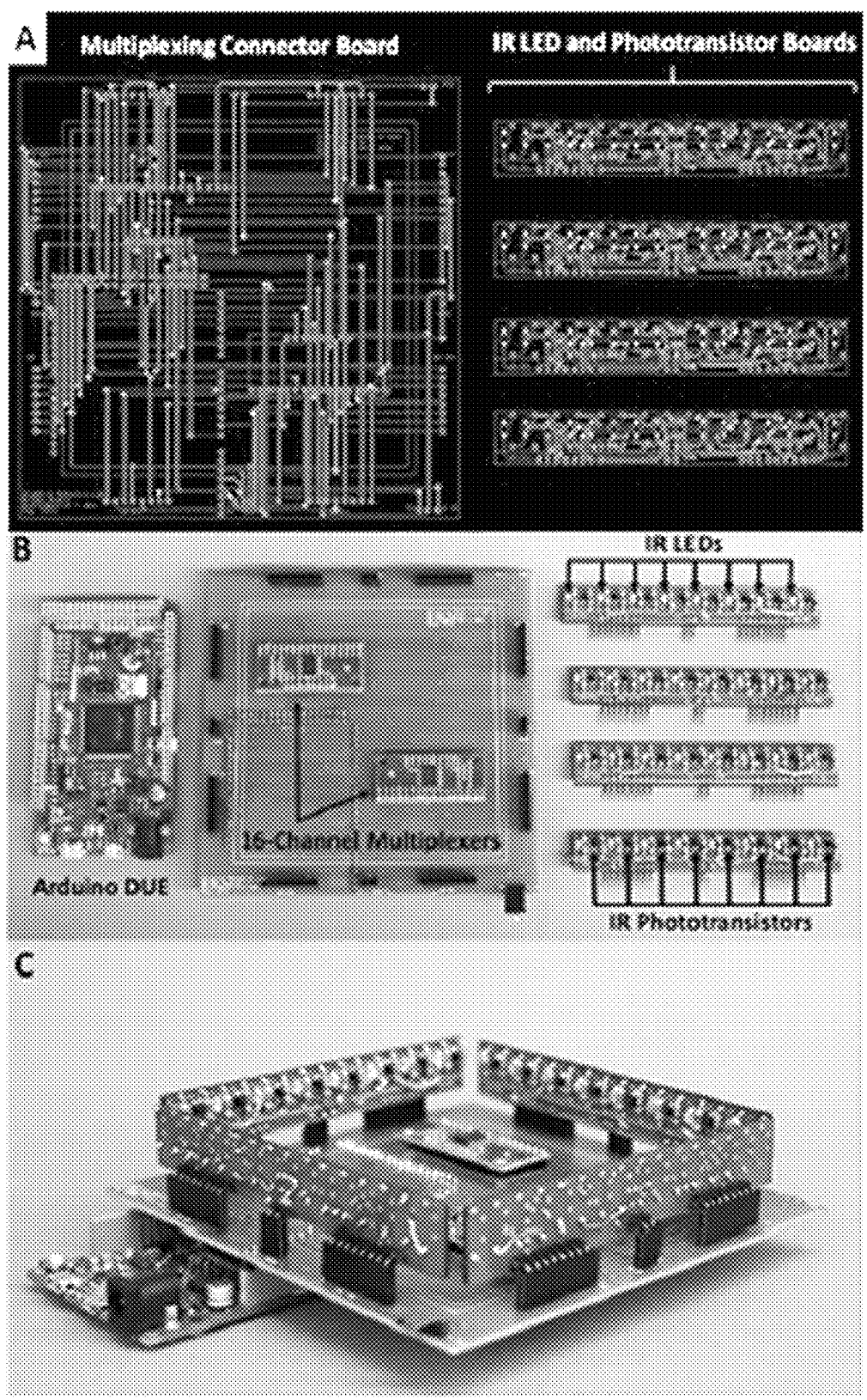
FIG. 3 shows exemplary electronics for soft touch sensor (A) PCB design. (B) Populated circuit boards. (C) Assembled electronics.

An Arduino DUE microcontroller was used to drive 32 IR LEDs (TSML1020; Vishay Semiconductors) and read voltages across each of the IR phototransistors (TSML1020; Vishay Semiconductors). Two multiplexers (CD74HC4067; Texas Instruments) were used to interface with the phototransistors so that two analog input pins on the Arduino DUE can measure the voltage across each of the 32 phototransistors. FIG. 3a shows the design of five custom circuit boards that integrate the electronics for the soft touch sensor. Each of the four edge pieces hosts eight LEDs and eight phototransistors as shown in FIG. 3b. These edge pieces attach to the connector board using right angle headers as shown in FIG. 3c. The connector board also hosts the multiplexer breakout boards and Arduino DUE.

Figure 4:
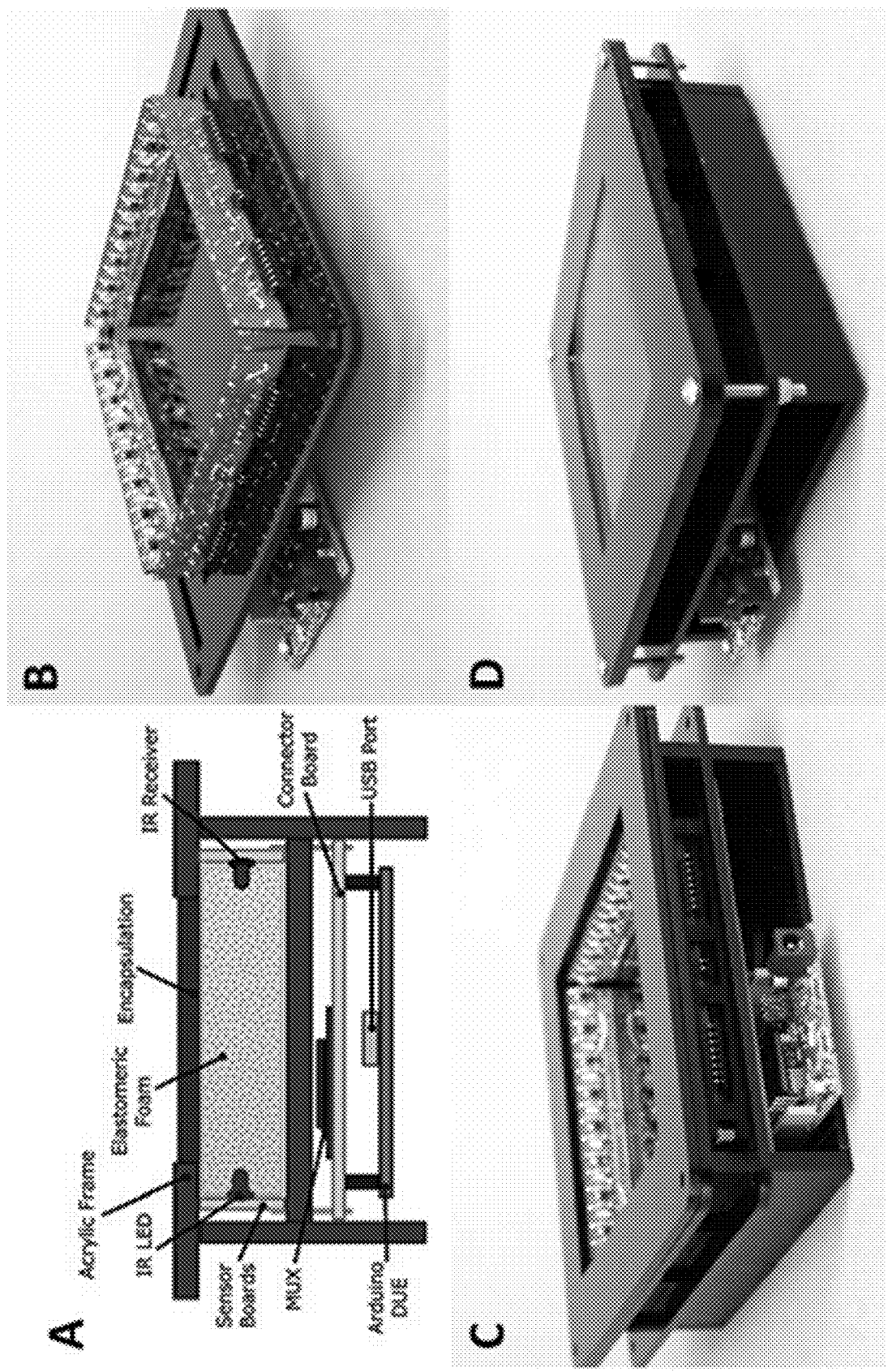
FIG. 4 shows an exemplary completed soft sensor. (A) Cross-section of assembled foam touch sensor. (B) Partially assembled device. (C) Full enclosure with USB access. (D) Elastomeric foam and encapsulation added.

Shown in FIG. 4, a laser cut acrylic enclosure houses the electronics. FIG. 4a shows a cross-section view and FIG. 4b shows a rigid surface under the foam that ensures reproducible results when compressing the foam. FIG. 4c shows the outer housing with an opening to allow connections to the USB port on the Arduino DUE. FIG. 4d shows the device with the integrated foam. The elastomeric foam is a 12.5 mm thick polyurethane sheet (8643K502; McMaster-Carr). The foam was cut slightly larger than the opening so that compression holds the foam in place. The foam layer was covered with a room temperature vulcanization (RTV) silicone blend (Ecoflex-30; Smooth-On Inc.). A colored pigment (Silc Pig; Smooth-On Inc.) was mixed with the silicone to prevent light transmission, minimizing the effect of ambient light on the soft sensor.

Automated Data Collection

Figure 5:
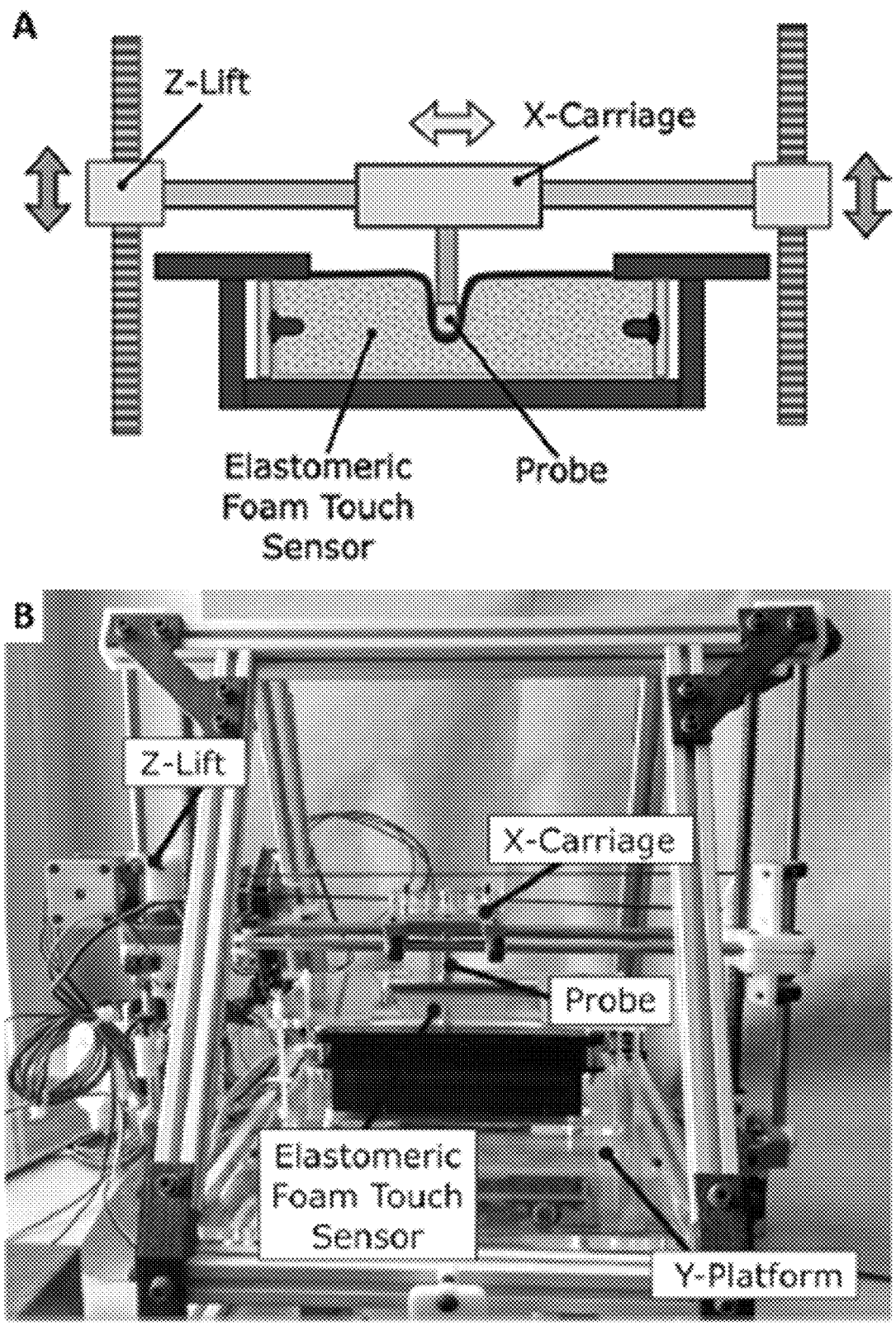
FIG. 5 shows an exemplary automated testing apparatus. (A) A mechanized probe moves to fixed coordinates, simulating finger presses as the soft sensor sends data. (B) A converted 3D printer controls the position of the test probe.

To collect training data, an array of X, Y and Z coordinates was used to sample the volume of the soft touch screen. A probe was attached to the X-carriage of a 3D printer as shown in FIG. 5, and mounted the soft sensor device to the print bed. Software written in Processing coordinates the 3D printer's movement with data collection from the soft sensor. This software uses serial communication to receive data from the soft sensor's Arduino Due and to send G-code to the printer's controller, which uses a modified GRBL firmware.

The origin was defined as the bottom left corner at the surface of the sensor. Measurements were recorded every 5 mm in the X and Y directions, ranging from 0 mm to 75 mm. For each XY pair, measurements were recorded at the surface and at depths of 4, 6, 8, and 10 mm. At each of these 256 distinct locations, the measurement process repeats five times, yielding 5120 data samples.

Figure 6:
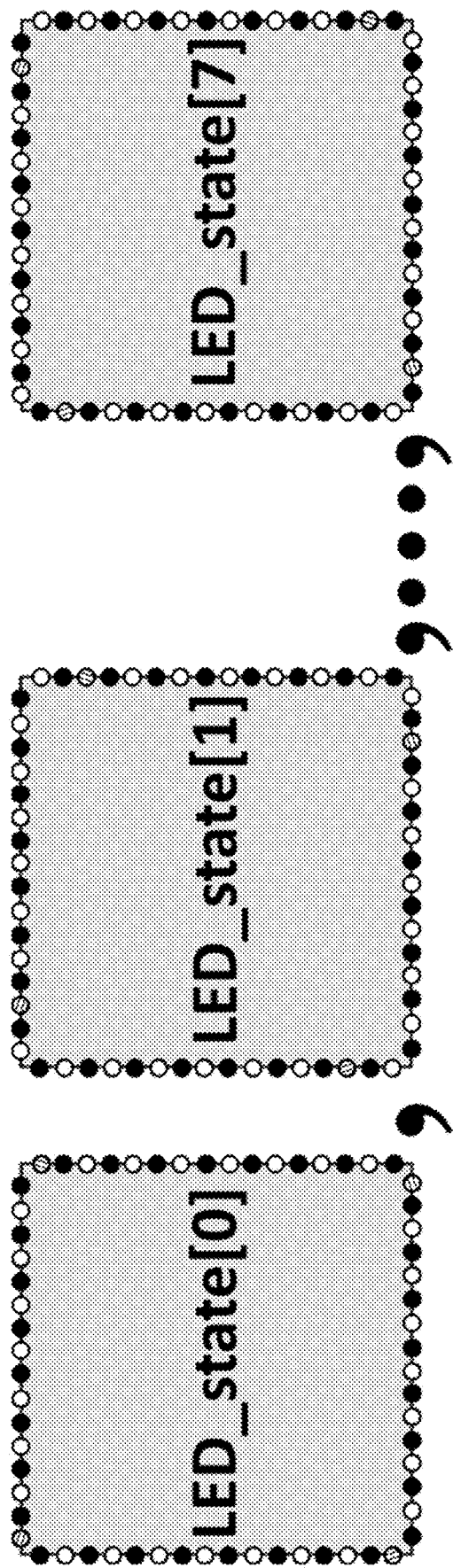
FIG. 6 is sensor data is collected at eight distinct LED states. For each state, the voltage across all 32 phototransistors is measured, yielding 256 features for each measurement.

For each distinct location, four IR LEDs were illuminated at once as shown in FIG. 6. For each of the eight illumination states, the software measures and records the voltage across all 32 phototransistors. A full measurement cycle yields 256 features, with each voltage represented as an integer from 0 to 1023. The Processing software exports labeled training data as CSV that can then be processed using open source machine learning libraries.

Machine Learning Overview

In this example, all machine learning was performed using the caret Package built for R. Prior to any data analysis, recorded data were randomly sampled and reserved 20% as a testing set. For an initial proof of concept, a random forest algorithm was used. 500 trees were used for each model and the number of variables available for splitting at each tree node (mtry) was tuned using five-fold cross-validation.

Touch Classification

Figure 7:
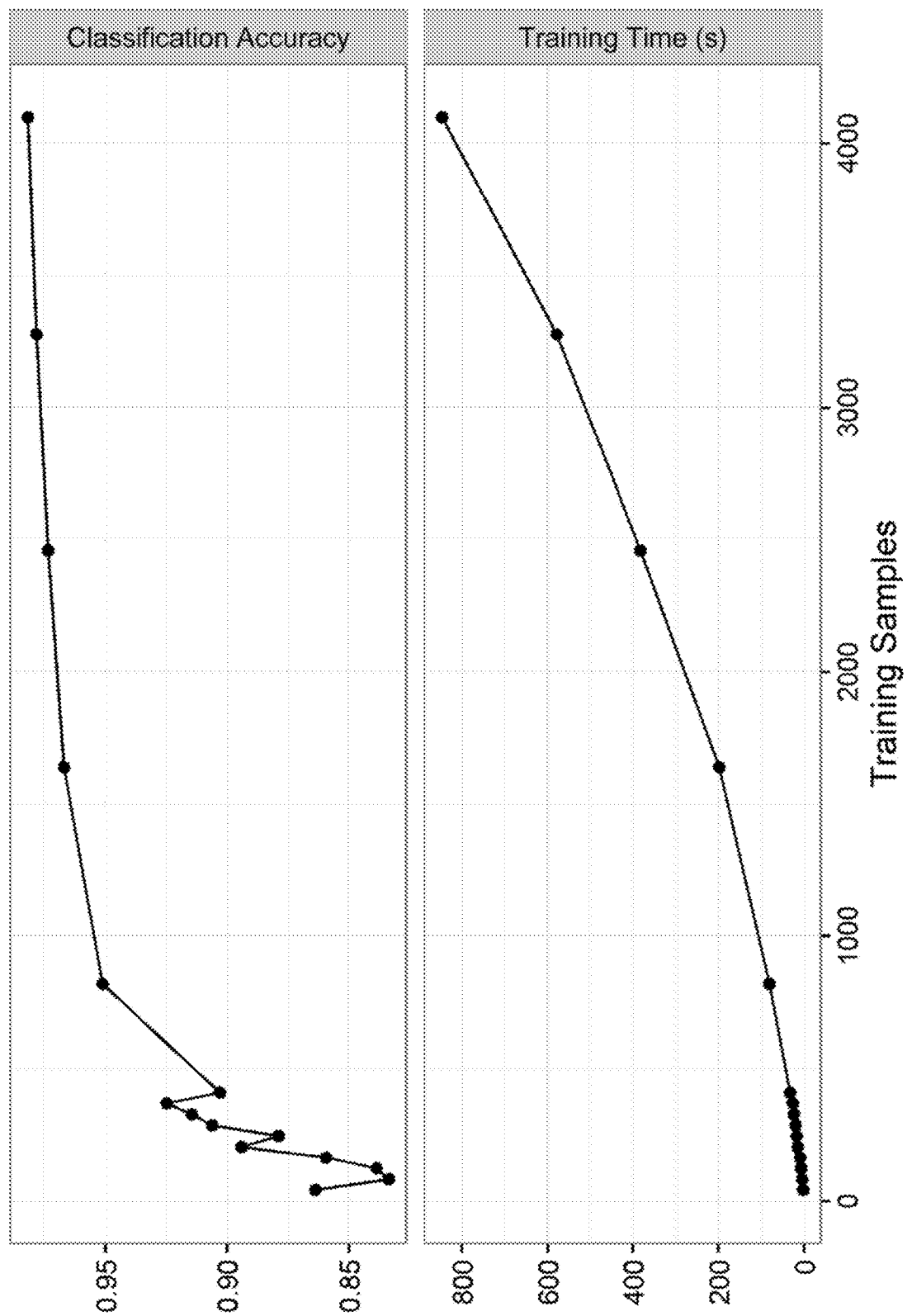
FIG. 7 is a chart showing touch classification accuracy and fit time as a function of training sample size.

The first model developed was a classification of whether or not the sensor is being touched. Each of the 5120 data samples are labeled with a Boolean state for touching or not. 20% of the data were randomly reserved as a fixed testing set. Of the remaining training set, partitions were created ranging from 1%-100% of the training data. Random forests were used to build a classifier to predict whether the device is being touched. FIG. 7 shows the classification accuracy results. Using just 20% (819 samples) of the training data, a classification model achieves an accuracy of 95.1%. Using the full training set (4096 samples), the classification accuracy increases to 98.2%.

Location Prediction

Figure 8:
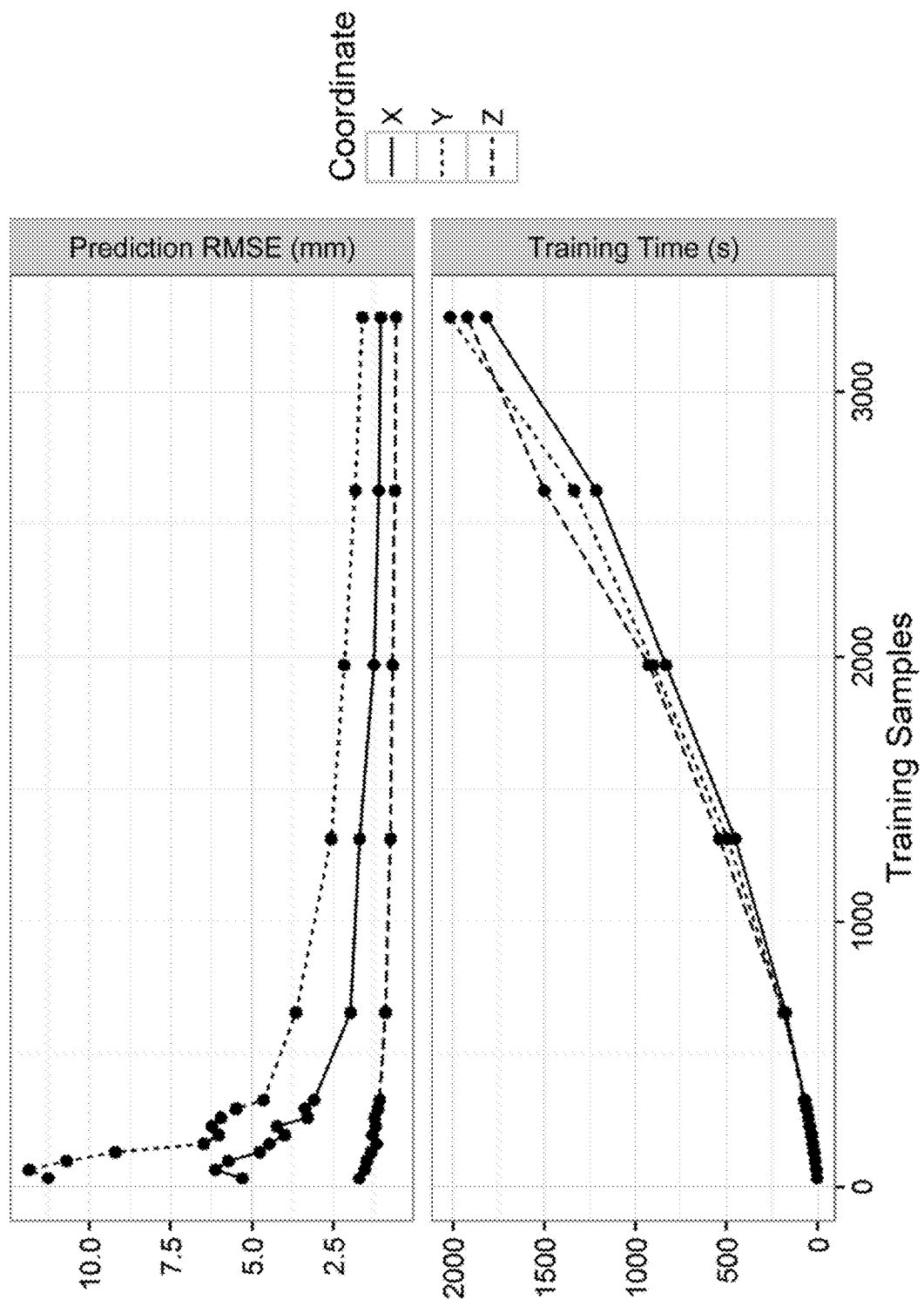
FIG. 8 is a chart showing prediction RMSE and training time as a function of training sample size.

After developing a model for classifying touch, the next step was to build a model to predict the location and depth of the touch. As described for the touch model, 20% of the available data were reserved as a testing set. For this regression problem, data for which the Z-depth is 4, 6, 8, or 10 mm were used. This provided a testing set of 816 samples, and an available training set of up to 3280 samples. The size of the training set was varied and fit models for X, Y, and Z location using each subset of the data. FIG. 8 shows the resulting root-mean-square error (RMSE) and training time. Using just 40% (1312 samples) of the training data, the RMSE for the X and Y location predictions is less than 3 mm and the RMSE for the z depth prediction is less than 0.76 mm. With the full training set (3280 samples), the RMSE for the X and Y location predictions is less than 1.6 mm, and the RMSE for the Z depth prediction is 0.59 mm.

Figure 9:
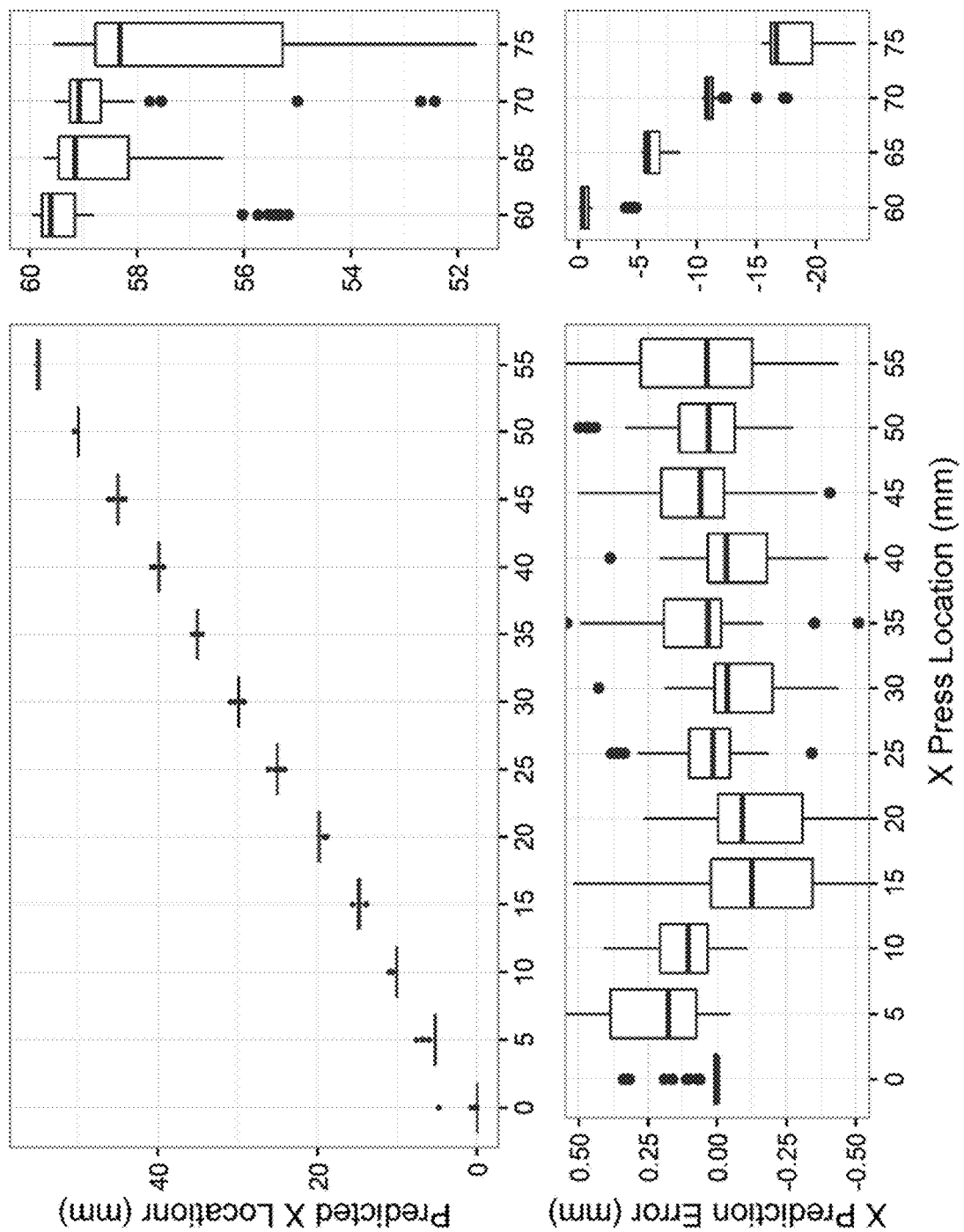
FIG. 9 are charts showing predicted X location and error.
Figure 10:
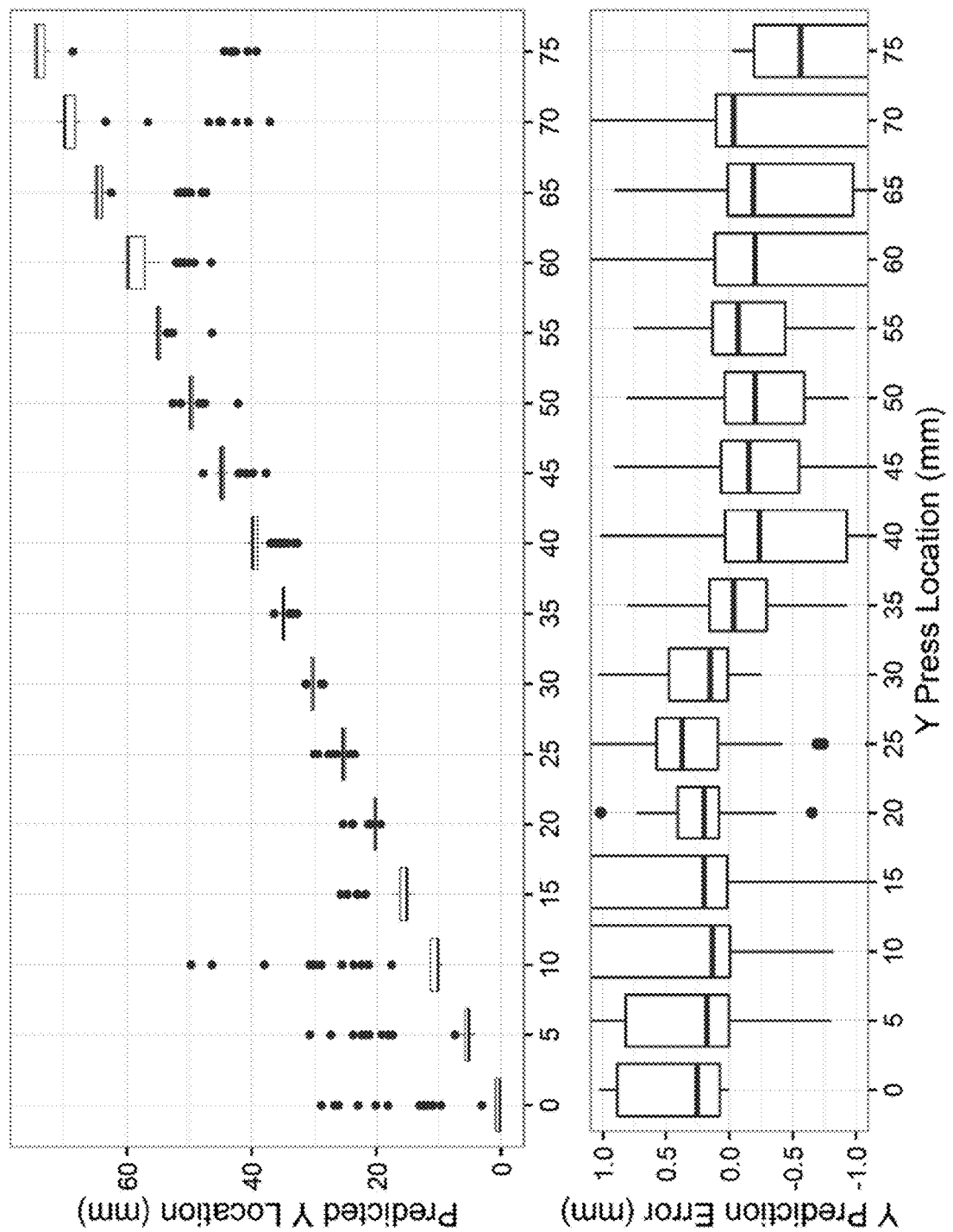
FIG. 10 are charts showing predicted Y location and error.
Figure 11:
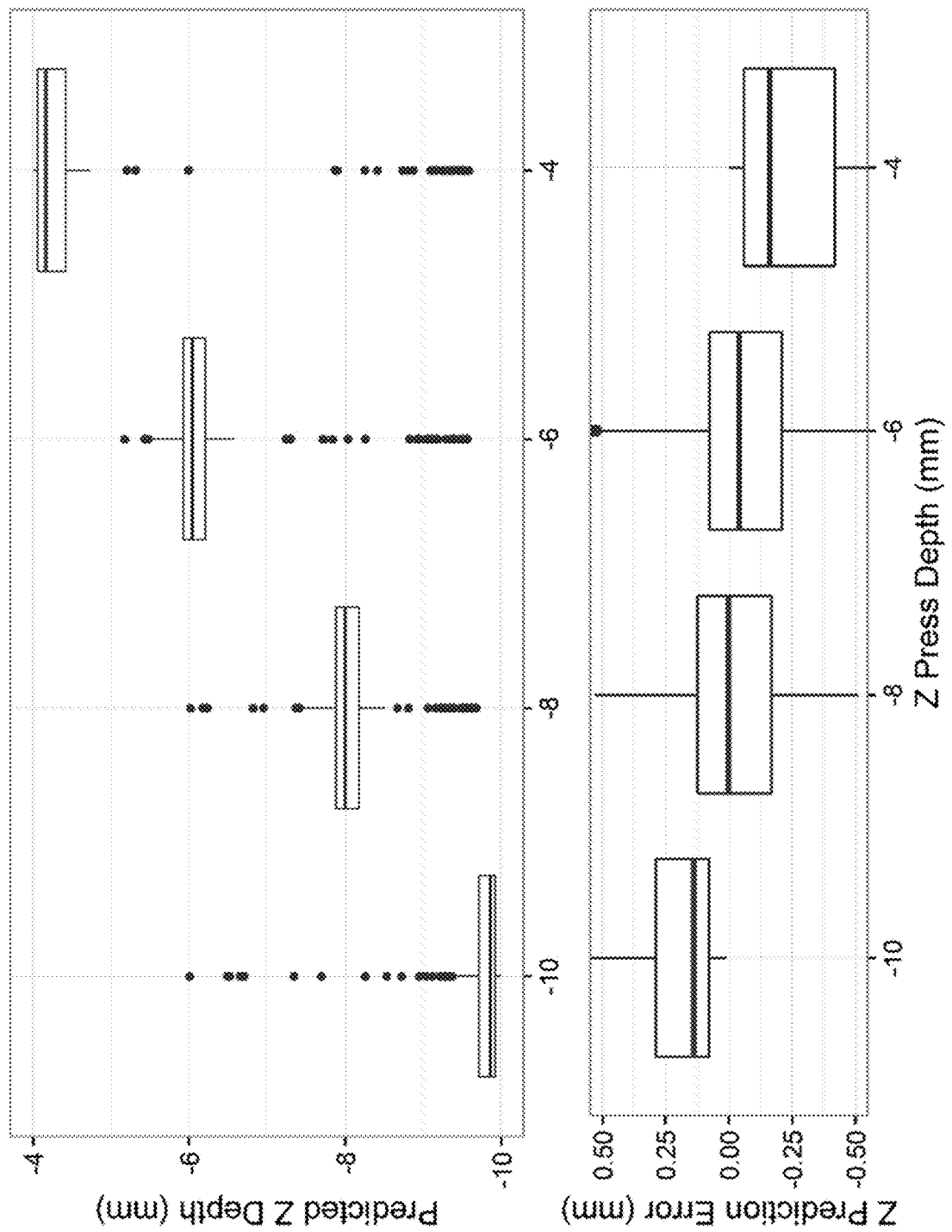
FIG. 11 are charts showing predicted Z depth and error.
Figure 12:
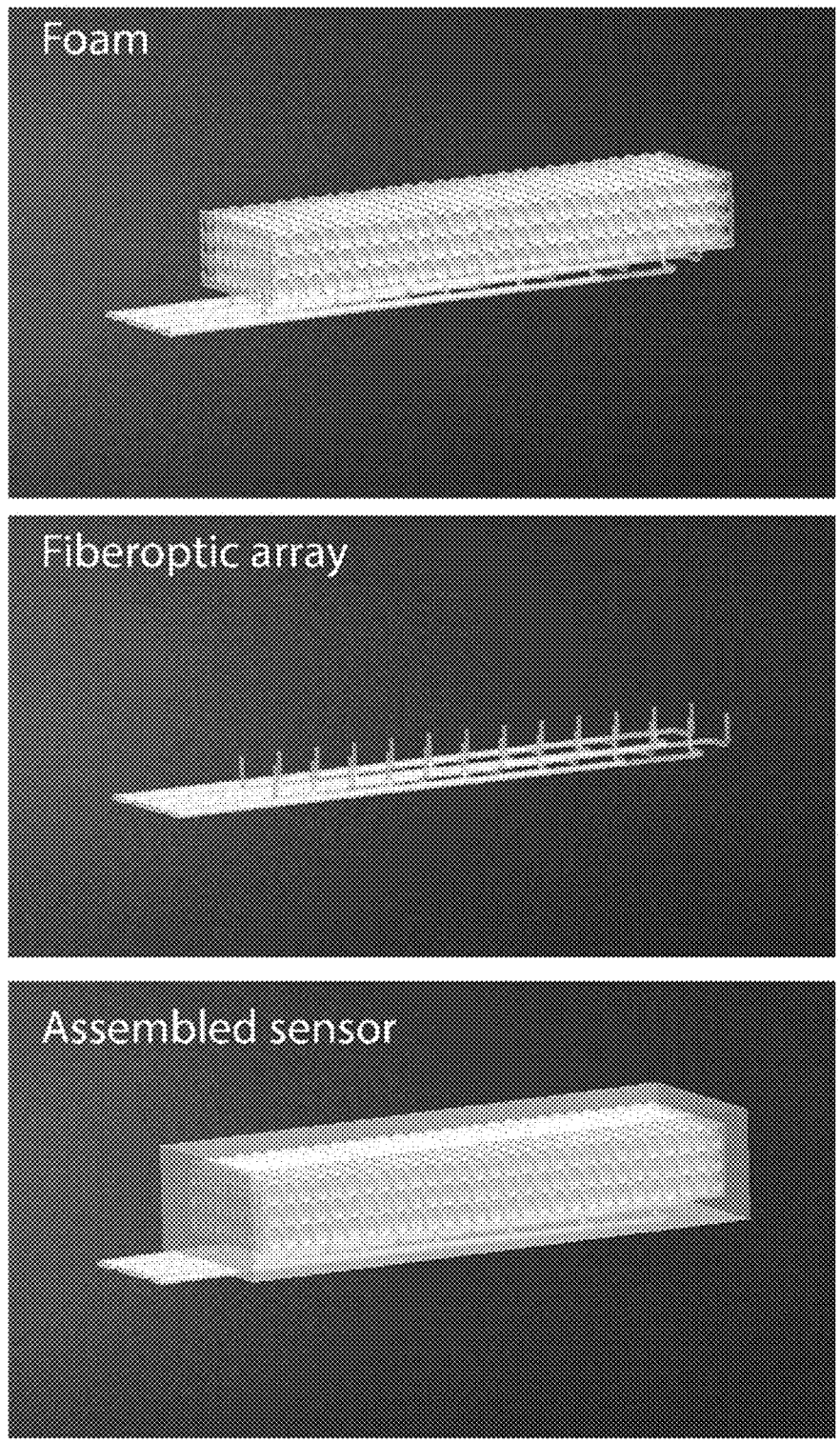
FIG. 12 illustrates an assembly of a sensor and actuator pair.

The predictions for X, Y, and Z locations are shown in FIGS. 9, 10, and 11 respectively. Each set of predictions is based on models fit using the full training sets. In each figure, the top plot shows the predicted values for each location and the bottom plot shows the difference between predicted and actual values. For the X predictions in FIG. 9, the data is split into two sets because the prediction accuracy decreases for X>55 mm. For X<=55 mm, the magnitude of the prediction error tends to be less than 0.5 mm, but increases to nearly 20 mm near the right edge of the touch sensor.

For the Y predictions shown in FIG. 10, the magnitude of prediction error tends to be less than 1 mm. The outliers, however, then to be skewed towards the center of the touch sensor. Outliers near the bottom of the touch sensor have positive error, while those near the top tend to have negative error. This same trend is evident for the Z predictions in FIG. 11. Most predictions for Z however, are within 0.5 mm of the nominal value.

Conclusions

These initial results show that elastomeric foams coupled with infrared LEDs and phototransistors are a promising technology for creating a soft touch sensor. The accuracy of the preliminary tests are sufficient for many human robot interaction tasks; the RMSE of the predicted location is <1.6 mm and the RMSE of the predicted depth is <0.6 mm. More sophisticated machine learning algorithms (e.g., neural networks) and more training data can further improve these results. Moreover, much of the error in mean values came from outliers. Averaging multiple samples prior to input into the trained model may mitigate the effect of these outliers. With these improvements, this soft foam touch sensor may imbue robots with a sense of touch rivalling that of humans. This device is of particular interest in robotics due to its flexible form factor and low cost. The elastomeric foams used in this device are easily cast into 3D shapes to form a tactile skin for a soft robot. Furthermore, this initial prototype may cost approximately $150, including the cost of custom PCB fabrication. The actual sensors and emitters may cost less than $1 each, even when bought in quantities of one. Through design for manufacturing, the cost could be reduced even further by working with even less expensive components.

Example 2

FIGS. 12-16 illustrate another example of a sensor. These optical power outputs can be coupled with machine learning to train the computer to know what shape the foam has taken given a distribution of intensities from the lightguides. It may also be possible to interpret the shape without machine learning. The foams can also be actuators.

The soft foam sensor disclosed in this example can have three-dimensional proprioceptive capabilities. The sensor can include an open-cell rubber foam sealed from external air with a solid rubber layer. Optical fiber terminals are fed into the foam, enabling its illumination. Each fiber can be used to both illuminate the foam and to detect light intensity throughout the foam. An optical beam splitter can separate the two light paths.

Figure 13:
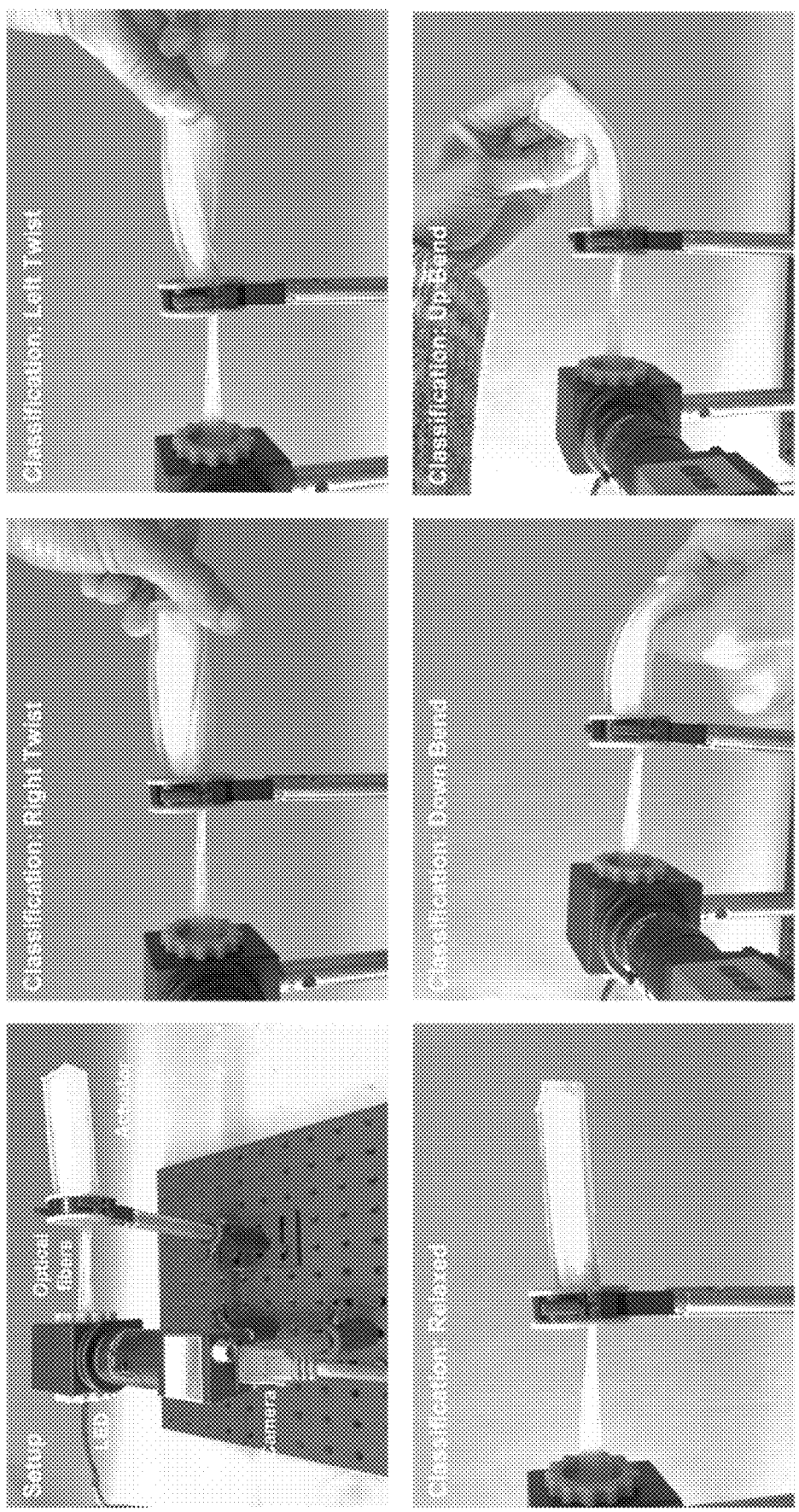
FIG. 13 illustrates an optical setup for measuring shape change in foam using optical lightguides.
Figure 14:
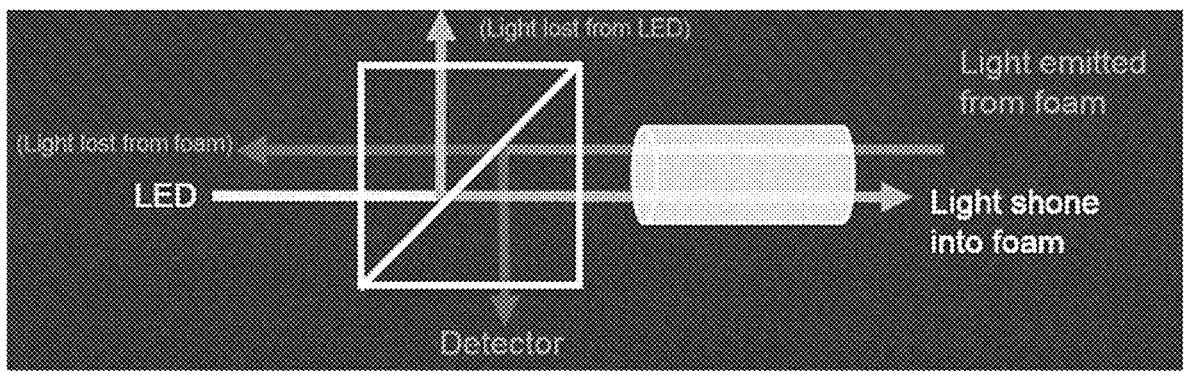
FIG. 14 illustrates using a beam splitter to direct light through the lightguide into the foam.
Figure 15:
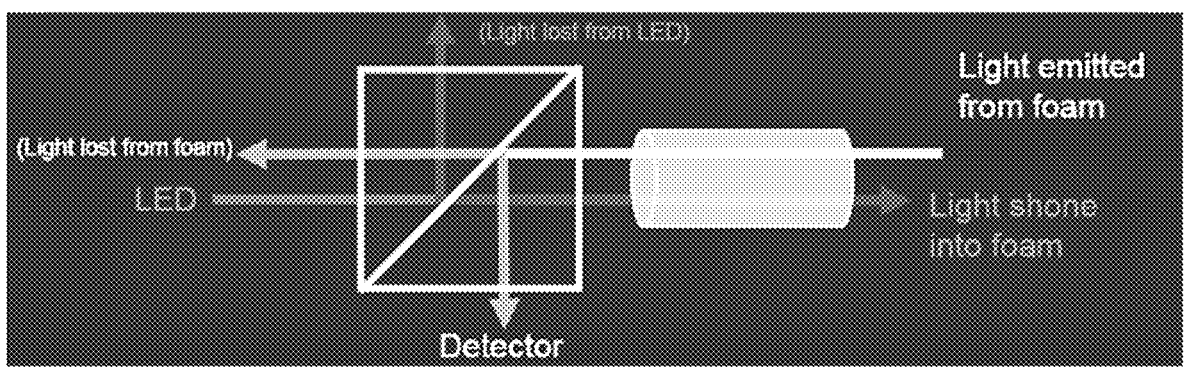
FIG. 15 illustrates using the beam splitter of FIG. 14 to direct light leaving the foam toward a camera.
Figure 16:
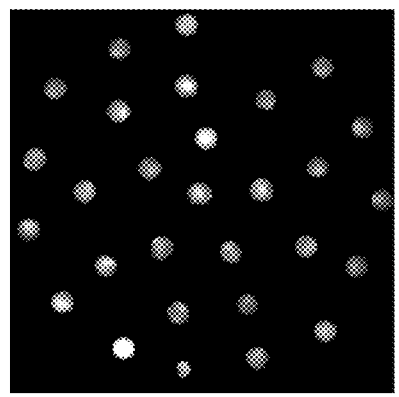
FIG. 16 illustrates what signal output looks like incident on the camera for one mode of deformation.

For example, the optical fibers are illustrated connecting the LED and camera to the actuator in FIG. 13. Optical fibers can be inserted into (e.g., below a surface of) the actuator.

Using the average light intensity values collected from each optical fiber coupled with machine learning algorithms (e.g., K-nearest-neighbors and K-means clustering), the sensor's physical configuration can be classified as one of five possible states: relaxed, twisted to the right, twisted to the left, bent up, or bent down. The sensor can detect additional configurations using algorithms. The degree to which the actuator is in each state can be quantified. More sophisticated algorithms (e.g., principal component analysis, neural networks) can enable more complex and higher resolution configuration description.

Although the present disclosure has been described with respect to one or more particular embodiments, it will be understood that other embodiments of the present disclosure may be made without departing from the scope of the present disclosure. Hence, the present disclosure is deemed limited only by the appended claims and the reasonable interpretation thereof.

The invention claimed is:

1. A sensor comprising:
   an elastomeric foam component defining a top surface, a bottom surface, and a plurality of lateral surfaces,
   a light source disposed on and/or at least partially in a first lateral surface of the plurality of lateral surfaces of the elastomeric foam component; and
   a light receiver disposed on and/or in and/or at least partially in a second lateral surface of the plurality of lateral surfaces of the elastomeric foam component, the second lateral surface being disposed opposite to the first lateral surface,
   wherein light from the light source is received by the light receiver by way of transmission through the elastomeric foam component to determine a position and/or depth of a displacement of a portion of the top surface of the elastomeric foam component relative to the bottom surface of the elastomeric foam component.

2. The sensor of claim 1, wherein the light source comprises a plurality of light sources and the light receiver comprises a plurality of light receivers.

3. The sensor of claim 2, wherein at least one light source of the plurality of light sources comprises a light-emitting diode (LED), an optical fiber, or a combination thereof.

4. The sensor or claim 3, wherein the LED comprises an infrared LED.

5. The sensor of claim 2, wherein at least one light receiver of the plurality of light receivers comprises a photodetector, a photodiode, a phototransistor, a photoDarlington transistor, or a combination thereof.

6. The sensor of claim 2, wherein the plurality of light sources and the plurality of light receivers are arranged in an array.

7. The sensor of claim 2, wherein the plurality of light sources and the plurality of light receivers alternate around the plurality of lateral surfaces defining a perimeter of the elastomeric foam component.

8. The sensor of claim 2, further comprising a controller configured to operate the plurality of light sources and to receive signals from the plurality of light receivers.

9. The sensor of claim 8, further comprising at least one multiplexer in electronic communication with the plurality of light receivers.

10. The sensor of claim 8, wherein the controller is configured to determine a position and/or depth of a displacement of a portion of the top surface of the elastomeric foam component relative to the bottom surface of the elastomeric foam component.

11. The sensor of claim 2, further comprising a housing to constrain at least one of the plurality of lateral surfaces of the elastomeric foam component.

12. The sensor of claim 2, wherein at least a portion of the elastomeric foam component is colored such that an effect of ambient light on the plurality of light receivers is reduced or eliminated.

13. The sensor of claim 2, wherein a number of light sources in the plurality of light sources is different from a number of light receivers in the plurality of light receivers.

14. The sensor of claim 2, wherein the plurality of light sources and the plurality of light receivers have randomized localization.

15. A touch input for a computing device comprising the sensor of claim 1.

16. A household object comprising the sensor of claim 1.

17. A soft robot skin comprising the sensor of claim 1.

18. A feedback system for a soft robotic system comprising the sensor of claim 1.

19. A method comprising:
applying a force to the sensor of claim 1; and
determining, using the controller, a position and/or a depth of the force applied to the sensor.

20. The method of claim 19, further comprising transmitting, using the controller, an output based on the position and/or the depth of the force.

21. The method of claim 20, further comprising using the output from the sensor as an input in another device.

22. The method of claim 19, wherein the determining is based at least in part on a transmittance of light between at least one light source of the plurality of light sources and at least one light receiver of the plurality of light receivers.

23. The method of claim 19, wherein the determining is based at least in part on a transmittance of light between all the light sources or a selected number of the light sources of the plurality of light sources and at least one light receiver of the plurality of light receivers.

24. A non-transitory computer-readable storage medium, comprising one or more programs for executing the following steps on one or more computing devices:
receiving a signal from the sensor of claim 1 corresponding to a measured light at the light receiver; and
determining, via a stored mapping of measured light at the light receiver to a position and a depth of a displacement of the portion of the top surface of the elastomeric foam component relative to the bottom surface of the elastomeric foam, a position and a depth of an input to the sensor.

25. The non-transitory computer-readable storage medium of claim 24, wherein the position and the depth of the input to the sensor is determined by a trained machine learning model.

26. The non-transitory computer-readable storage medium of claim 24, wherein the position and the depth of the force applied to the sensor is determined by a model trained by a machine learning algorithm using a plurality of different force inputs to the sensor for the sensor data.

27. The non-transitory computer-readable storage medium of claim 26, wherein the one or more programs comprise instructions to, upon execution by a processor, implement training of the model by acts comprising:
a) moving a mechanized probe to a plurality of predetermined coordinates along an X-axis and/or Y-axis adjacent the top surface of the elastomeric foam component;
b) at each of the predetermined coordinates, moving a distal end of the mechanized probe along at least a Z-axis from a predetermined first position to a predetermined second position to displace a portion of the top surface of the elastomeric foam component relative to the bottom surface of the elastomeric foam;
c) recording the measurements of at least one of the plurality of light receivers during and/or following movement of the distal end of the mechanized probe along the at least the Z-axis, at each of the predetermined coordinates, from the predetermined first position to the predetermined second position to displace the portion of the top surface of the elastomeric foam component relative to the bottom surface of the elastomeric foam;
d) training the machine learning algorithm using the recorded measurements of the at least one of the plurality of light receivers; and
e) generating a nonlinear model using machine learning to map the displacement of the portion of the top surface of the elastomeric foam component relative to the bottom surface of the elastomeric foam at each of the predetermined coordinates to the measurements of the at least one of the plurality of light receivers for each of the predetermined coordinates.

28. The sensor of claim 1, wherein the sensor comprises a communication pathway to output to an external system signals from the light receiver disposed on and/or at least partially in at least one of the plurality of lateral surfaces of the elastomeric foam component.

29. The sensor of claim 1, wherein a transmittance of light from the light source to the light receiver through the elastomeric foam component is decreased or eliminated responsive to a displacement of a portion of the top surface of the elastomeric foam component toward the bottom surface of the elastomeric foam component.

30. The sensor of claim 1, wherein a distance between the light source and the light receiver is not changed responsive to a displacement of a portion of the top surface of the elastomeric foam component toward the bottom surface of the elastomeric foam component.

31. The sensor of claim 1, wherein a light path from the light source to the light receiver is at least substantially parallel to the top surface.

32. The sensor of claim 1, wherein the top surface of the elastomeric foam component defines a central region comprising a touch surface and a peripheral region, wherein the light source and the light receiver are disposed beneath the peripheral region.

33. The sensor of claim 1, wherein the top surface of the elastomeric foam component is operative to receive touch inputs from a user.

34. The sensor of claim 1, wherein the light source is disposed opposite to the light receiver.

35. The sensor of claim 1, wherein the light source is not disposed directly opposite to the light receiver.

36. The sensor of claim 1, wherein the light source is disposed fully within the first lateral surface and/or the light receiver is disposed fully within the second lateral surface.

37. The sensor of claim 2, wherein at least one light source of the plurality of light sources is disposed fully within a lateral surface of the plurality of surfaces and/or at least one light receiver of the plurality of light receivers is disposed fully within a lateral surface of the plurality of lateral surfaces.

* * * * *